US006038929A

United States Patent [19]

Smith

[11] Patent Number: 6,038,929

[45] Date of Patent: Mar. 21, 2000

[54] THREE-WAY VALVED APPARATUS AND METHOD FOR TESTING PRESSURE IN A FLUID SYSTEM

[75] Inventor: Richard Michael Smith, Salisbury, Md.

[73] Assignee: Dresser Industries, Inc., Dallas, Tex.

[21] Appl. No.: 09/196,378

[22] Filed: Nov. 19, 1998

[51] Int. Cl.[7] .......... G01L 7/00

[52] U.S. Cl. .......... 73/756; 73/40.5 R

[58] Field of Search .......... 73/756, 40.5 R, 73/49.1, 49.3

[56] References Cited

U.S. PATENT DOCUMENTS

| | | | |
|---|---|---|---|
| 3,882,715 | 5/1975 | Slinger . | |
| 3,982,421 | 9/1976 | Wallace . | |
| 4,272,985 | 6/1981 | Rapson et al. | 73/49.3 |
| 4,382,379 | 5/1983 | Kelly . | |
| 4,584,871 | 4/1986 | Lohn . | |
| 4,602,500 | 7/1986 | Kelly . | |
| 5,201,213 | 4/1993 | Henning . | |
| 5,372,031 | 12/1994 | Harmand . | |
| 5,665,903 | 9/1997 | Moran . | |

*Primary Examiner*—Joseph L. Felber
*Attorney, Agent, or Firm*—Haynes and Boone, LLP

[57] ABSTRACT

A system and method for testing the pressure in a fluid system, according to which a member is provided for connecting to the fluid system in a manner to receive fluid from the system. A hydraulic cylinder establishes a fluid pressure and is connected to the member so that the cylinder can establish a predetermined fluid pressure in the system which is measured by a gauge and monitored.

10 Claims, 1 Drawing Sheet

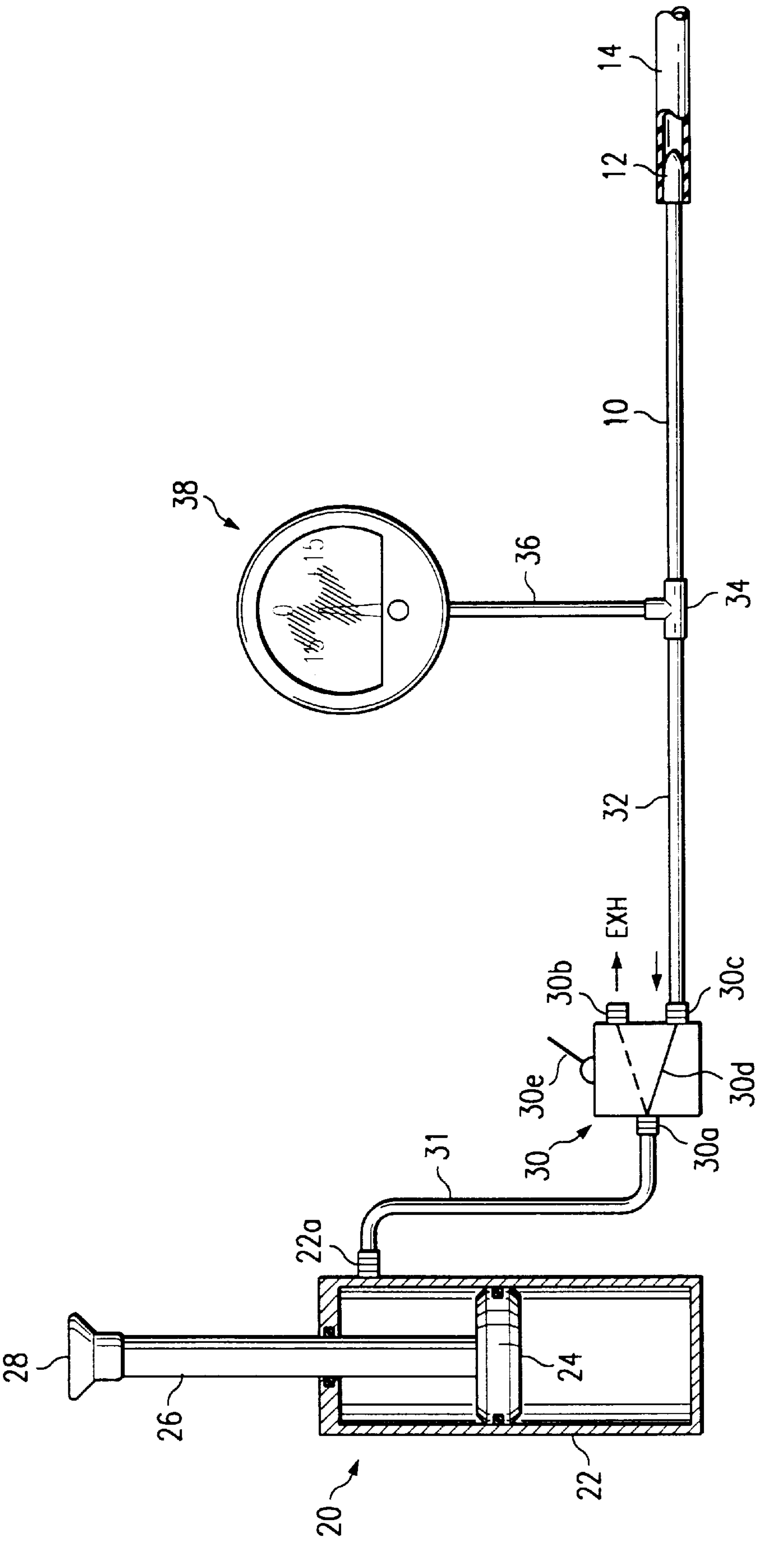
14
12
10
38
36
34
32
EXH
30b
30c
30e
30d
30
30a
31
22a
28
26
24
22
20

THREE-WAY VALVED APPARATUS AND METHOD FOR TESTING PRESSURE IN A FLUID SYSTEM

BACKGROUND OF THE INVENTION

This invention relates to a pressure/vacuum testing apparatus and method for a fluid system and, more particularly, to such a system and method which is portable, inexpensive, non-hazardous, and easy to use.

In certain closed fluid flow systems it is desirable, if not necessary, to test the system for leaks. For example, most gasoline dispensing systems for services stations, truck stops, and the like, include a system that recovers vapor from the vehicle tank during the dispensing of gasoline into the tank. The recovered vapor is passed from the dispensing nozzle and back into the underground gasoline storage tank. These gasoline dispensing and vapor recover systems must be essentially leak free to comply with governmental regulations.

However, since a multitude of nozzles, hoses, castings, breakaways and vapor tubing, along with their associated connectors, are utilized within the gasoline dispenser, or pumping unit, the potential for leakage is great.

Although various testing devices and systems are available, they are expensive, large, heavy, bulky and/or non-portable and often require an external power source.

SUMMARY OF THE INVENTION

Accordingly to the system and method of the present invention, a member is provided for connecting to the fluid system in a manner to receive fluid from the system. A hydraulic cylinder establishes a fluid pressure and is connected to the member so that the cylinder can establish a predetermined fluid pressure in the system which is measured by a gauge and monitored.

Several advantages result from the system and method of the present invention. For example, the system is relatively inexpensive, compact, light-weight, portable, and does not require an external power source. Therefore, it can easily be carried to, and connected in, an existing closed fluid system and check for leaks in the system.

BRIEF DESCRIPTION OF THE DRAWINGS

The drawing is diagrammatic view of the system of the present invention.

DETAILED DESCRIPTION OF THE PREFERRED EMBODIMENT

The system of the present invention is shown in the drawing and includes a conduit 10 having a hollow barbed fitting 12 that is attachable within the end portion of a hose 14 connected to the system under test (not shown) which for the purpose of example, is a fluid system, such as a vapor recovery system associated with a gasoline dispensing system.

A fluid cylinder is shown, in general, by the reference numeral 20 and includes a cylindrical housing 22 having an fluid inlet/outlet port 22*a* disposed at one end portion thereof (the upper end portion as viewed in the drawing). A piston 24 is mounted for reciprocal movement in the housing 22, and a rod 26 extends from one face of the piston and projects from the latter end portion of the housing. A knob 28 is attached to the distal end of the rod 26.

A valve 30 is provided and has an inlet port 30*a* and two outlet ports 30*b* and 30*c*. A switch 30*d* is provided in the valve 30 and is operated by an actuator 30*e* to selectively direct fluid from the inlet port 30*a* to one of the outlet ports 30*b* and 30*c* as shown schematically by the dashed line and the solid line, respectively.

A conduit 31 extends from the port 22*a* of the housing 22 to the inlet port 30*a* of the valve 30. The outlet port 30*b* of the valve 30 is connected to atmosphere, and a conduit 32 extends from the outlet port 30*c* to a tee fitting 34. The tee fitting 34 is also connected to the conduit 10 and to a conduit 36 extending to a pressure gauge 38. The gauge 38 is conventional and functions to provide an indication of positive or negative pressure in the system.

In operation, the switch 30*d* of the valve 30 is switched to the position shown by the dashed line to connect and expose the housing 22 to atmosphere, via the hose 31 and the valve port 30*b*. The knob 28, and therefore the piston 24, is moved upwardly to expel any fluid in the cylinder to atmosphere via the conduit 31 and through the ports 30*a* and 30*b* of the valve 30.

The switch 30*a* is then moved by the actutor 30*e* to the position shown by the solid line to connect the cylinder 20 to the hose 14 via the conduit 31, the valve 30, the conduit 32, and the tee fitting 34, and thus create a closed system. The knob 28 is then pushed towards the housing 22 to move the piston 24 downwardly, as viewed in the drawing, to draw fluid from the system into the housing 22 and create a vacuum in the system which is indicated by the gauge 38. Once the desired vacuum level is reached, as indicated by the gauge 38, the switch 30*a* is switched back to the position shown by the dashed line to isolate the system. The gauge 38 is then monitored for any decrease in the vacuum (or increase in pressure) in the system which would indicate a leak within the system.

In the event it is desired to establish a positive pressure in the system and test for any variations in this pressure corresponding to leaks in the system, the switch 30*d* of the valve 30 is initially switched to the position shown by the dashed line to connect and expose the housing 22 to atmosphere, via the hose 31. The knob 28, and therefore the piston 24, is moved downwardly to charge the housing 22 with atmospheric air. The switch 30*a* is then moved to the position indicated by the solid line in the drawing. The knob 28 is then pulled away from the housing 22 to move the piston 24 upwardly as viewed in the drawing. This expels the air from the housing 22 and into the system via the conduit 31 and the valve 30 to establish a predetermined positive pressure in the system as indicated by the gauge 38. Once the desired pressure is reached, as indicated by the gauge 38, the switch 30*a* is switched back to the position shown by the dashed line to isolate the system. The gauge 38 can then be monitored for any decrease in the pressure in the system which would indicate a leak within the system.

Thus, the system of the present invention provides an accurate indication of leakage in a closed fluid flow system, yet is relatively inexpensive. Moreover, since the system of the present invention is relatively compact, light-weight, and portable, and does not require an external power source, it can easily be carried to, and connected in, an existing closed fluid system to check for leaks in the system.

It is understood that the fluid referred to above can be in the form of a liquid fluid or a gaseous fluid, with an example of the latter being a gasoline vapor in a vapor recovery system associated with a gasoline dispensing system, as discussed above.

Modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. Apparatus for testing fluid pressure in a fluid system, the apparatus comprising:

a member for connecting to the fluid system in a manner to receive fluid from the system;

a housing, a piston adapted for reciprocal movement in the housing for establishing a fluid pressure;

a valve for selectively connecting the housing to the member or to atmosphere, the valve being adapted to connect the housing to atmosphere so that the movement of the piston in one direction expels any fluid from the housing into the atmosphere, and connect the housing to the system so that movement of the piston in the other direction draws fluid from the system into the housing to create a negative pressure in the system;

wherein after the negative pressure is created in the system, the valve is adapted to reconnect the housing to atmosphere to isolate the system; and a gauge for registering pressure in the system.

2. The apparatus of claim 1 wherein the member is a conduit and further comprising means for connecting the conduit to a conduit of the fluid system.

3. Apparatus for testing the pressure in a fluid system, the apparatus comprising:

a member for connecting to the fluid system in a manner to receive fluid from the system;

a housing, a piston adapted for reciprocal movement in the housing for establishing a fluid pressure;

a valve for selectively connecting the housing to the member or to atmosphere, the valve being adapted to:

connect the housing to atmosphere so that the movement of the piston in one direction draws fluid from the atmosphere into the housing, and connect the housing to the system so that movement of the piston in the other direction expels the fluid from the housing into the system to create a positive pressure in the system;

wherein after the positive pressure is created in the system, the valve is adapted to reconnect the housing to atmosphere to isolate the system; and a gauge for registering pressure in the system.

4. The apparatus of claim 3 wherein the member is a conduit and further comprising means for connecting the conduit to a conduit of the fluid system.

5. A method for testing the fluid pressure in a fluid system, the method comprising the steps of exposing a fluid cylinder to atmosphere, moving a piston in the cylinder in one direction to expel any fluid in the cylinder to the atmosphere, connecting the cylinder to the system to isolate the cylinder from the atmosphere, moving the piston in a direction opposite to the one direction to draw fluid from the system into the cylinder to reduce the pressure in the system, reexposing the cylinder to atmosphere to isolate the system after the second step of moving, measuring the reduced pressure in the system after the latter step of moving, and monitoring the measured pressure to determine any leakage in the system.

6. A method for testing the fluid pressure in a fluid system, the method comprising the steps of exposing a fluid cylinder to atmosphere, moving a piston in the cylinder in a direction to draw atmospheric fluid into the cylinder, connecting the cylinder to the system to isolate the cylinder from the atmosphere, moving the piston in a direction opposite to the one direction to expel the fluid from the cylinder into the system to increase the pressure in the system, reexposing the cylinder to atmosphere to isolate the system after the second step of moving, measuring the increased pressure in the system after the latter step of moving, and monitoring the measured pressure to determine any leakage in the system.

7. Apparatus for testing the pressure in a fluid system, the device comprising a conduit for connecting to the fluid system in a manner to receive fluid from the system, a hydraulic cylinder for establishing a fluid pressure, a valve switchable between a first position in which it connects the cylinder to the conduit for establishing a fluid pressure in the system, and a second position in which it connects the cylinder to the atmosphere to isolate the system.

8. The apparatus of claim 7 wherein the hydraulic cylinder comprises a housing, and a piston adapted for reciprocal movement in the housing, whereby movement of the piston in one direction with the valve in its first position draws fluid from the system into the housing and thus creases a negative pressure in the system, and movement of the piston in the other direction with the valve in its first position expels fluid from the housing into the system thus creates a positive pressure in the system.

9. The apparatus of claim 8 wherein movement of the valve to its second position enables the movement of the piston to draw atmospheric fluid into the housing and expel fluid from the housing into the atmosphere.

10. The apparatus of claim 9 wherein, with the valve in its second position, movement of the piston in the one direction draws atmospheric fluid into the housing and movement of the piston in the other direction expels fluid from the housing into the atmosphere.

* * * * *